Patented Jan. 15, 1952

UNITED STATES PATENT OFFICE 2,582,235

SYNTHETIC RESINS FROM MALEIC ANHYDRIDE-ALKYL OLEATE ADDUCT AND AN ALKYLENE DIAMINE

John C. Cowan and Howard M. Teeter, Peoria, Ill., assignors to United States of America as represented by the Secretary of Agriculture No Drawing. Application July 16, 1948, Serial No. 39,178

6 Claims. (Cl. 260—78)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to synthetic resins, and has among its objects utilization of lower alkyl oleates, particularly methyl oleate, as the initial materials in production of the resins.

In the production of polymeric fat acids, as for example by polymerizing fatty oils containing glycerides of polymerizable fat acids, such as soybean oil, linseed oil, cottonseed oil, perilla oil, dehydrated castor oil, and so forth, and by eliminating the monomeric fraction, as for example by distillation, a considerable monomeric fraction is obtained. This fraction, as for example, from soybean oil, comprises about 22 to 25 percent methyl esters of saturated acids, 18 to 25 percent methyl linoleate, and 50 to 60 percent methyl oleate.

Prior attempts have been made to utilize this monomeric fraction in the production of synthetic resins by first forming an adduct by reacting maleic anhydride with the fraction and reacting the adduct thus formed with organic diamines or with dihydric alcohols. These attempts have not been successful, inasmuch as the resins obtained in every case were gelled, i. e., insoluble and infusible, and therefore of very little value. These prior failures have been attributed to the excessively high functionality of the maleic anhydride adduct.

The maleic anhydride-methyl oleate adduct formed by reacting maleic anhydride with methyl oleate may have following structural formula:

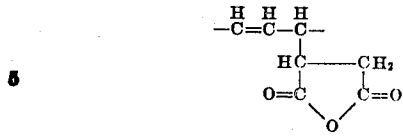

The point of attachment of the maleic anhydride residue is always to a carbon atom adjacent to the double bond. The group

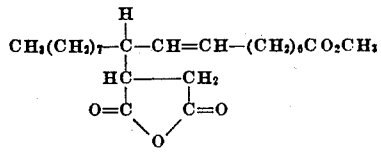

may be reversed as

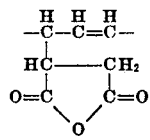

and/or may be displaced one carbon atom to the right or left in the hydrocarbon chain.

A characteristic of this adduct is its apparent trifunctionality, and the reaction of it with difunctional compounds, such as diamines or dihydric alcohols, would be expected to result in cross-linking between elements, consistent with the findings in the case of the adduct of monomeric fraction previously mentioned, giving products of gelled, insoluble, and infusible type.

However, it has been found according to the present invention that the maleic anhydride-methyl oleate adduct may be reacted with the organic diamines to give linear polyamides which are flexible, fusible, and have other properties which make them valuable as ingredients for paper coatings, as agents for moisture-proofing and laminating, and the like. They are also useful in anti-corrosive coatings for metal, and for protective and decorative coatings such as spirit varnishes, lacquers, and the like.

This invention results in a valuable use for the monomeric fraction before mentioned, since the 50 to 60 percent methyl oleate is easily separated from the fraction by known means in substantially pure form, and the ester can be utilized as the initial material in production of valuable resins.

In general, according to the invention, the adduct, formed by reacting maleic anhydride with the methyl oleate or other lower alkyl oleate in substantially equimolecular proportions, is reacted with an alkylene diamine such as ethylene diamine, propylene diamine, butylene diamine, hexamethylene diamine, and the like, or mixtures thereof. The reaction preferably is carried out by heating substantially equimolecular amounts of the adduct and the diamine for about 4–20 hours at temperatures within the range of 120° to 225° C. The duration of heating may be shorter or longer depending on the temperature, i. e., the shorter period corresponding to the higher temperature. It is only necessary to heat until a flexible, fusible, linear polyamide is formed.

The resins thus produced have a molecular weight within the range of 2000 to 4000 depending upon the specific reactants and the time and temperature of reaction. The majority of specific products have molecular weights of about 3000. They are brown, translucent solids, soluble in the usual organic solvents such as, for example, isopropanol, chloroform, butanol, and benzene. They dissolve in ethanol, forming two liquid layers but are insoluble in ether.

The adduct itself may be prepared according to known methods, such as those disclosed by Wheeler et al., in Oil and Soap, 19, pages 23-27 (1942). It is preferable, however, to obtain it from the monomeric fraction previously mentioned, for economic reasons.

The trimethyl ester may likewise be used, prepared according to Ross et al., in Journal of American Chemical Society, 68 pages 1373-6 (1946). It is preferred to prepare it by procedure similar to that of Ross et al., except that instead of converting the crude adduct to the trimethyl ester, it is isolated and purified by molecular distillation. In brief, the procedure is as follows: The two compounds are mixed in the proper proportions as outlined by Ross et al., and heated for a few hours in an inert atmosphere at a temperature of about 200° C., and the adduct is recovered from the reaction mixture by distillation.

The following example illustrates the invention in greater detail.

*Example 1*

Maleic anhydride-methyl oleate adduct was prepared by reacting maleic anhydride with methyl oleate as described above. It was a colorless liquid having an iodine value of 60.5, a neutralization equivalent in aqueous pyridine of 195.7 and a saponification equivalent of 132.7. The calculated values are respectively, 64.3, 197.3, and 131.5.

The adduct thus produced was heated with an equimolecular amount of ethylene diamine for 17 hours at 204°-222° C. The resin formed had neutralization equivalents of 2175 and 5470 for the basic and acidic groups, respectively. It contained about 2 percent unreacted methoxyl groups. The product was a light brown, translucent resin, elastic and fusible. It had a molecular weight of about 3000. It was soluble in isopropanol, butanol, and chloroform and is capable of forming protective coatings or films.

In a similar manner the maleic anhydride-oleic acid adduct may be reacted with ethylene diamine.

Other alkylene diamines may be substituted for the ethylene diamine in the example given above.

Having thus described the invention, what is claimed:

1. A process comprising reacting an adduct with a substantially equimolecular proportion of an alkylene diamine at a temperature of 120° to 225° C. until a flexible, fusible, linear polyamide is formed, said adduct being formed by reacting maleic anhydride with a substantially pure lower alkyl oleate in substantially equimolecular proportions.

2. The process of claim 1 wherein the oleate is methyl oleate.

3. The process of claim 1 wherein the diamine is ethylene diamine.

4. The process of claim 3 wherein the oleate is methyl oleate.

5. A flexible, fusible, linear polyamide comprising the reaction product of an adduct with an alkylene diamine in substantially equimolecular proportions, characterized in that the adduct is one formed by reacting maleic anhydride with a substantially pure lower alkyl oleate in substantially equimolecular proportions.

6. The polyamide of claim 5 wherein the alkylene diamine is ethylene diamine and the alkyl oleate is methyl oleate.

JOHN C. COWAN.
HOWARD M. TEETER.

REFERENCES CITED

The following references are of record in the file of this patent:

UNITED STATES PATENTS

| Number | Name | Date |
| --- | --- | --- |
| 2,149,286 | Graves | Mar. 7, 1939 |
| 2,318,034 | Wayne | May 4, 1943 |
| 2,366,128 | Root | Dec. 26, 1944 |